Dec. 5, 1939.   F. N. COOLEY ET AL   2,182,395
POWER TRANSMITTING DEVICE
Filed April 19, 1937   3 Sheets-Sheet 3
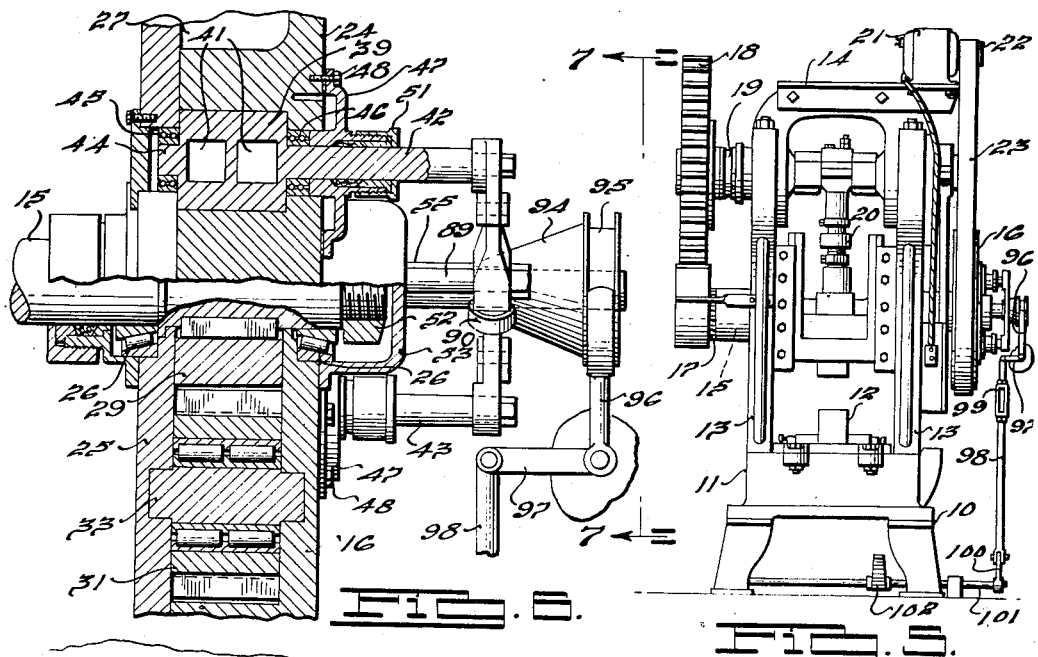
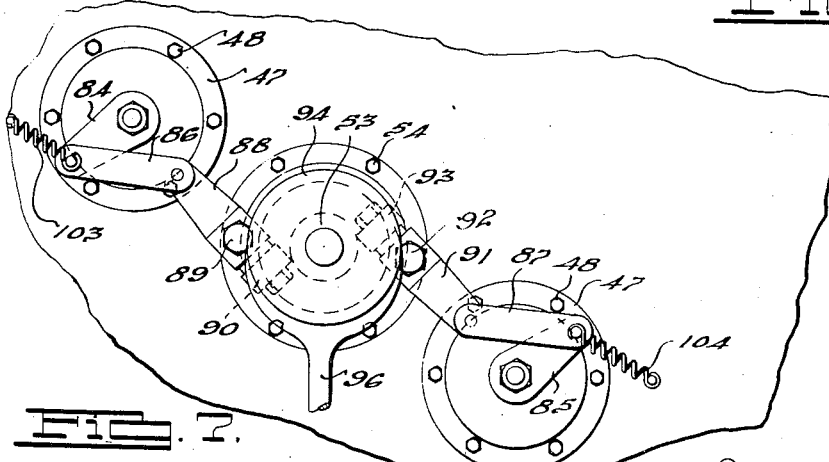
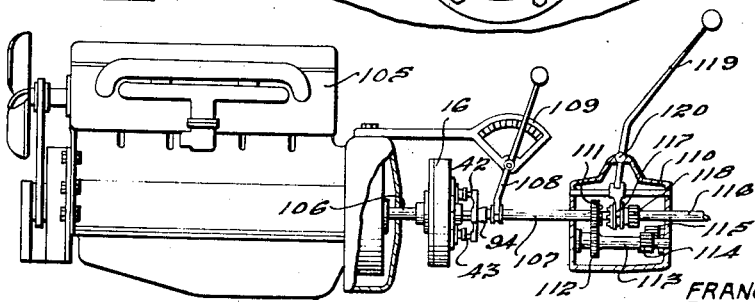
INVENTOR
FRANCIS N. COOLEY AND
RUSSELL J. HARTER.
ATTORNEYS.

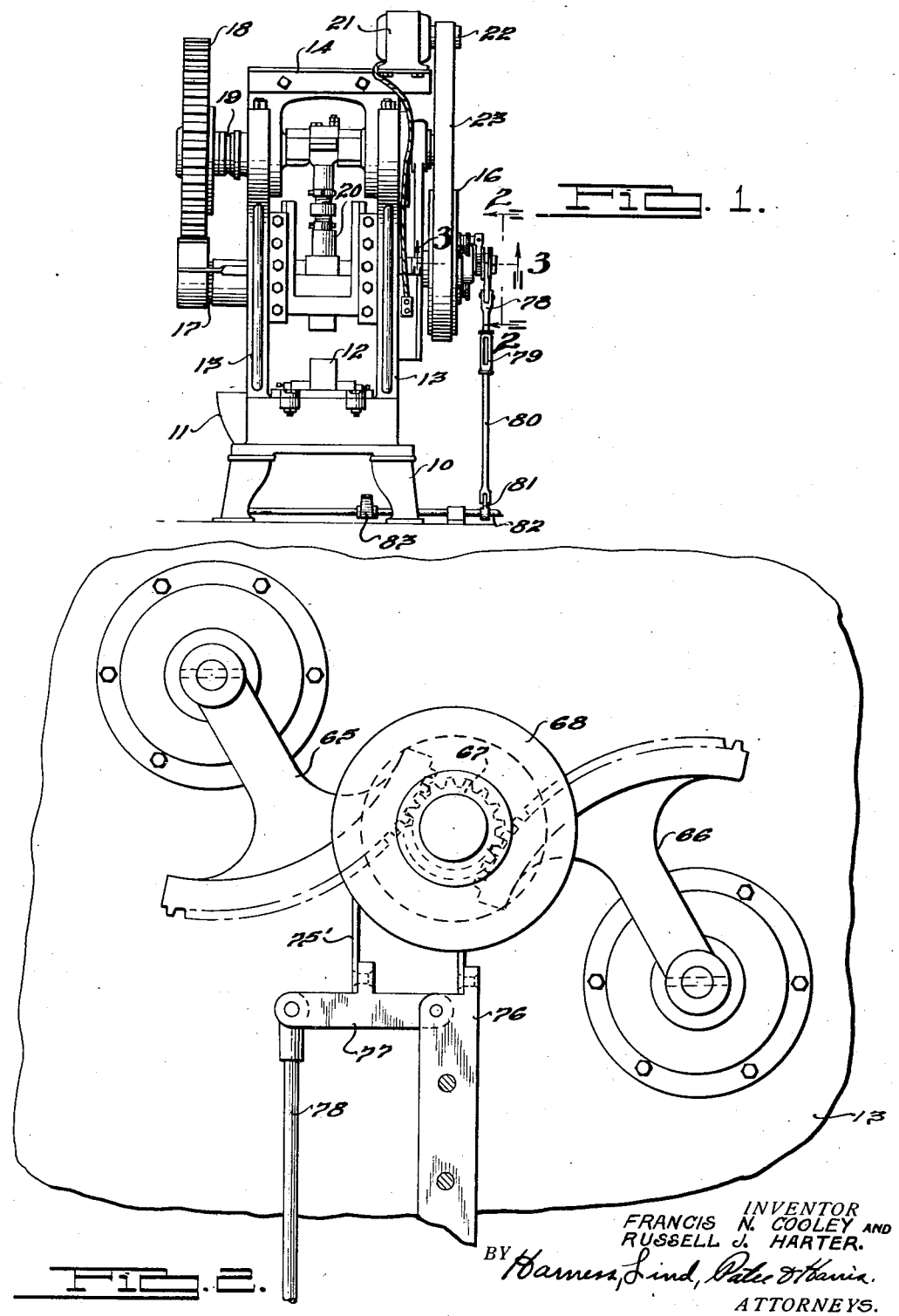

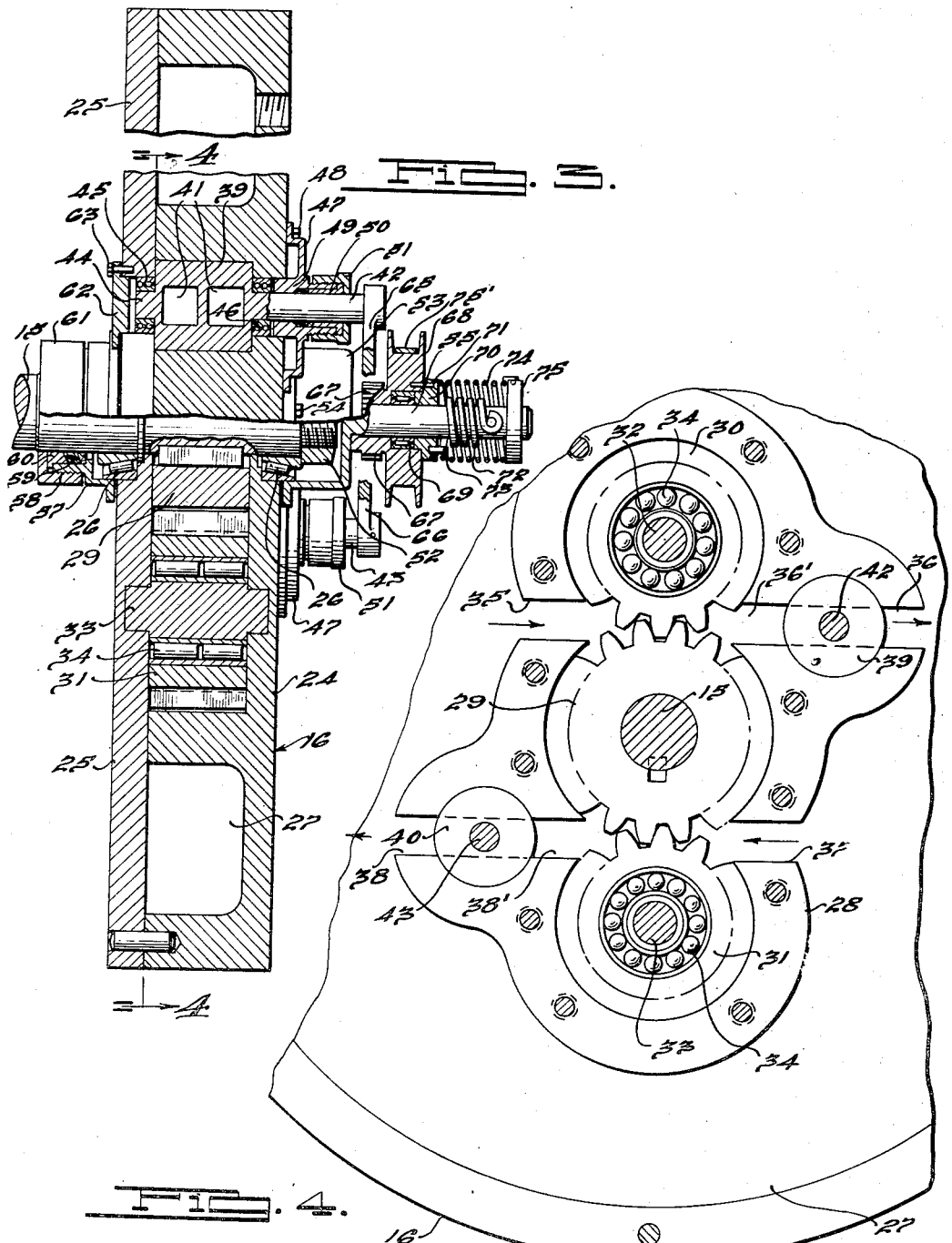

Patented Dec. 5, 1939

2,182,395

UNITED STATES PATENT OFFICE 2,182,395

POWER TRANSMITTING DEVICE

Francis N. Cooley and Russell J. Harter, Newcastle, Ind., assignors to Chrysler Corporation, Highland Park, Mich., a corporation of Delaware Application April 19, 1937, Serial No. 137,673

11 Claims. (Cl. 192—61)

This invention relates to a power transmitting device and more particularly to a clutch for operably connecting driving and driven means thereof.

An object of the invention is to provide an improved clutch which may be gently but quickly engaged and disengaged to respectively apply and discontinue the application of the torque of a driving member on means to be driven thereby, and preferably to employ a fluid medium for this purpose which will eliminate the violent shock incident to application and release of the driving torque by a power transmitting device including frictionally engageable parts.

Another object of the invention is to provide an improved device of the class described wherein the driving torque transmitted can be varied from a minimum to a maximum degree without the use of speed ratio changing mechanism and without subjecting parts of the clutch to substantial frictional or other wear.

Another object of the invention is the provision of a device of this type, of improved means for controlling the operation thereof, and more particularly to provide in a hydraulic clutch improved valving for controlling the fluid medium, and to provide improved means for actuating the valving.

The invention is especially adaptable for use in connection with power operated machines or presses where intermittent motion is required and where the prime mover is operated continuously although the finally driven element may be operated intermittently. In machines of this type the clutch mechanism must be of such character as will afford a quick but smoothly acting connection and disconnection between the associated parts. For the purpose of providing a power transmitting device to meet the above need we preferably utilize a driven drum member containing a fluid medium for locking in driving engagement elements carried by the drum and the member to be driven, respectively. We further provide improved valve mechanism for controlling the fluid medium to effect locking engagement and disengagement as aforesaid, and also novel means for actuating the valving. The above mechanism is compactly arranged so that a minimum of space is required for operation of the various parts thereof.

An illustrative embodiment of the above invention is shown in the accompanying drawings, in which:

Fig. 1 is a side elevational view of a power operated press embodying the invention.

Fig. 2 is an enlarged fragmentary side elevational view taken on the line 2—2 of Fig. 1, and illustrating a portion of the valve actuating mechanism.

Fig. 3 is an enlarged sectional view taken on the line 3—3 of Fig. 1.

Fig. 4 is a fragmentary side elevational view taken on the line 4—4 of Fig. 3.

Fig. 5 is a view similar to Fig. 1 showing a modified form of the valve actuating means illustrated in Figs. 1, 2 and 3.

Fig. 6 is an enlarged fragmentary side elevational view, similar to Fig. 3, illustrating in particular the valve actuating means shown in Fig. 5.

Fig. 7 is a fragmentary side elevational view taken on the line 7—7 of Fig. 6 and illustrating a portion of the valve actuating means shown therein.

Fig. 8 is a side elevational view, partly in section, of a power plant and direction control mechanism to which the improved form of clutch and valve actuating means shown in Fig. 6 has been applied.

Referring to the drawings and particularly Figs. 1 and 5, there is shown a power driven press generally designated by the numeral 10. This press includes a base 11 upon which is mounted a die member 12 and upright supporting side portions 13 which are suitably connected at their upper extremities by a cross member 14. A horizontally disposed driving shaft 15 is suitably journaled in the supporting portions 13 and carries a flywheel or drum member 16 at one end portion thereof as will more fully appear hereafter. Secured to the opposite end portion of the shaft 15 is a driving pinion 17 meshing with a gear 18 for driving a shaft 19 journaled in the supporting portions 13. A plunger 20 is reciprocably driven by the shaft 19 for cooperation with the die member 12. The press is driven by an electric motor 21 mounted on the cross member 14 and has a driving pulley 22 which is drivingly connected to the flywheel or drum member 16 by a continuous belt 23.

A clutch embodying the invention is so associated with the drum 16 and the shaft 15 as to selectively connect and disconnect the same. It will be understood that the construction and mode of operation of the flywheel or drum member 16 is the same throughout the views illustrating modified forms of the means for actuating the valve mechanism carried by the flywheel and hence like numerals have been applied to identical parts where the same are also shown in Figs. 3 and 6.

The flywheel 16 includes a recessed casting 24 and a cover member 25 bolted or otherwise suitably secured thereto in fluid sealing relationship. The casting and cover member have aligned openings receiving the shaft 15 which is journaled in bearing structures 26. The cover member 25 has substantially plain inner and outer faces while the adjacent side of the casting 24 is provided with a fluid chamber 27 which surrounds a central boss portion formed integral with the casting 24, providing a housing structure 28 having circularly shaped compartments for receiving respectively a gear 29 non-rotatably secured to the shaft 15 and pinions 30 and 31 rotatably mounted on spindles 32 and 33, respectively, meshing with the gear 29. The spindles 32 and 33 are journaled on suitable bearing structures 34. The housing structure 28 has a fluid inlet passage 35 registering with the line of engagement of the teeth of the gear 29 and pinion 30 and an oppositely disposed discharge or outlet passage 36, and inlet and discharge passages 37 and 38, respectively, are similarly disposed with respect to the gear 29 and pinion 31, although the positions of these passages with respect to the housing structure is reversed from the position of the passages 35 and 36. The fluid outlet passages 36 and 38 are controlled by rotary valves 39 and 40, respectively, each of which has openings 41 adapted to be moved into and out of registration with the respective passages. The valves 39 and 40 have stem portions 42 and 43, respectively, and are otherwise similar both in their construction and in arrangement with respect to the flywheel 16. As illustrated in Figs. 3 and 6, it will be noted that the valve 39 has a reduced end portion 44 journaled in a bearing structure 45 supported by the cover member 24, while the stem 42 is journaled in a bearing structure 46 carried by the casting 24.

A sealing cap 47 is secured to the outer face of the casting 24 by bolts 48 and it has a centrally tubular portion 49 for receiving the valve stem 42. The tubular portion 49 has an enlarged inner end extending into the opening in the casting 24 in which is accommodated the valve stem 42 and bearing structure 46. The inner diameter of the outwardly disposed portion of the tubular portion of the sealing cap 47 is enlarged to receive a packing sleeve 50 for preventing the escape of fluid axially of the valve stem and the packing is retained in place by a cap 51 threaded on the exterior of the outer part of the tubular portion 49. A bearing retaining nut 52 is threaded on the shaft 15 and is enclosed by a cover plate 53 which is secured to the casting 24 by bolts or screws 54. The cover plate 53 has a shaft 55 extending axially therefrom and with which is associated the valve actuating means hereinafter described.

Suitable bearing retaining and packing means is provided for the shaft 15 at the outer face of the cover member 25, this means including an annular cap part 57 having a central aperture for receiving the shaft 15 and an axially extending annular flange 58 between which and the shaft 15 is a suitable packing ring 59 having a radially extending portion 60. The packing ring 59 is retained in position by a cap part 61 threaded onto the flange 58 of the cap part 57. The opening in the flywheel cover 25 accommodating the reduced portion 44 of the valve 39 and the bearing structure 45 is closed by a cap 62 secured to the cover 25 by bolts 63.

From the foregoing it will be understood that as the flywheel or drum member 16 is rotatably driven by the motor 21 and the valves 39 and 40 are in the positions illustrated in Fig. 4, the openings 41 register with the respective outlet passages and fluid entering the housing through the inlet passages 35 and 37 passes through the outlet passages 36 and 38 respectively, and the flywheel 16 will rotate relative to the shaft 15, the pinions 30 and 31 revolving about the gear 29 non-rotatably secured to the shaft 15. When, however, it is desired to transmit the driving from the flywheel 16 to the shaft 15 the valves 39 and 40 are rotated to a position in which the openings 41 thereof are out of registration with the respective fluid outlet passages, thus trapping the fluid medium in the relatively small space illustrated at 36' and 38'. The back pressure caused by the fluid so trapped locks the pinions 30 and 31 against rotation relative to the gear 29 and the driving force is transmitted from the flywheel 16 to the shaft 15. Rotation of the latter shaft rotates the shaft 19, through pinion 17 and gear 19, for reciprocating the plunger 20.

As a further feature of the invention there is illustrated in Figs. 1, 2 and 3 a novel means for actuating the rotary valves 39 and 40 for establishing and discontinuing the driving relation set forth above. The valve stems 41 and 42 have non-rotatably secured thereto arms 65 and 66, respectively, each having a sector gear meshing with a pinion 67 rotatably mounted on the shaft 55 and carried by the cover plate 53. A brake drum 68, formed integral with the pinion 67, is journaled on the shaft 55 by a bearing structure 69, and an annular washer 70 having a central aperture accommodating the shaft 55 is secured by screws 71 to the drum 68. A relatively heavy spring 72 is coiled about the shaft 55 and has an end fixed to the latter and a free end adapted to engage a pin 73 carried by the washer 70 as will more fully appear hereafter. A second coil spring 74 having a diameter larger than the diameter of the spring 72 has one end fixed to a washer 75 non-rotatably fixed on the shaft 55, and the opposite end portion of the spring 74 is extended into an aperture in the washer 70.

Assuming that the valves 39 and 40 are in open position to permit passage of liquid through the outlet passages and the flywheel is rotatable relative to the shaft 15, the arms 65, 66, shaft 55 and the aforesaid parts carried thereby are rotating as a unit with the flywheel 16. When, however, it is desired to transmit the drive from the flywheel 16 to the shaft 15 a relatively light frictional force is applied to the brake drum 68 and the latter together with the pinion 67 are stopped momentarily, the shaft 55 continuing to rotate relative thereto. While the flywheel is making approximately one revolution after the drum 66 is momentarily stopped, the sector gears of arms 65 and 66 continue to revolve around the pinion until the free end of the coil spring 72 engages the pin 73, this rotation of the sector gears relative to the pinion 67 rotating the valves 39 and 40 to a closed position. Fluid is then trapped within the housing structure indicated at 36' and 38'. The fluid so trapped locks the pinions 30 and 31 against rotation relative to the gear 29 and the shaft 15 is driven by the flywheel. When the spring 72 strikes the pin 73 the drum 68 and pinion 67 are again rotated with the shaft 55 against the frictional force applied to the drum for momentarily stopping the pinion 67. During rotation of the pinion 67 and drum 66 relative to the shaft 55 as aforesaid, the spring 74 is tensioned and upon release of the frictional force applied to the drum 66, when it is desired to release the driving engagement between the flywheel 16 and shaft 15, the built up force in the spring 74 is sufficient to rotate the drum 66 and pinion 67 in a reverse direction, thus rotating the arms 65 and 66 and sector gears in a direction opposite from that previously described so that the valves 39 and 40 are rotated to an open position to permit fluid to pass from the housing structure 28 through the outlet passages and upon escape of the fluid previously trapped in the space 36' and 38', the pinions 30 and 31 are free to again revolve about the gear 29.

Frictional force is applied to the drum 66 and aforesaid by a band 75' having one end fixed to a support 76 and the opposite end thereof fixed to an arm 77 pivotally attached to the support 76. The arm 77 is rotated by a rod 78 having a turnbuckle connection 79 with a second rod 80 pivotally connected to an arm 81 non-rotatably secured to a crank arm 82 pivotally supported in the press base. The crank arm 82 is oscillated by a suitable pedal 83.

Referring to Figs. 5, 6 and 7, wherein there is shown a modified form of the valve actuating mechanism, the valve stems 42 and 43 have non-rotatably secured thereto, crank arms 84 and 85, respectively, to which links 86 and 87, respectively, are pivotally connected. A second link 88 is pivotally connected with the link 86 and is pivotally supported intermediate its ends by a pin 89 projecting from the adjacent face of the flywheel casting 24. A roller 90 is rotatably mounted on the free end portion of the link 88. A link 91 similar to the link 88 is pivotally connected with the link 87 and is also pivotally supported intermediate its ends by a pin 92 projecting from the adjacent face of the flywheel casting 24 and spaced from the pin 89. A roller 93 is rotatably carried by the free end portion of the link 91. A cone shaped member 94 is slidably mounted on the shaft 55 for movement axially thereof into and out of engagement with the rollers 90 and 93. An annular groove 95 is formed in the member 94 for receiving a bifurcated end portion of a pivotally mounted bell-crank lever 96 having an arm 97 pivotally connected with an extensible link 98 in which a turnbuckle 99 is included. The rod 98 is pivotally connected with an arm 100 of a crank 101 journaled in the base of the press and oscillatable by a pedal 102. When the valves 39 and 40 are in open position, as illustrated in Fig. 6, oscillation of the crank 101 moves the cone shaped member 94 into engagement with the rollers 90 and 93, pivoting the arms 88 and 91 about their supports and moving the crank arms 84 and 85 to rotate the valves to a closed position for the purposes hereinbefore stated. When the cone-shaped member 94 is moved out of engagement with the rollers 90 and 93 the valves 39 and 40 are rotated to an open position by springs 103 and 104 acting on the crank arms 84 and 85 respectively. The valves 39 and 40 may be positioned intermediate their fully open and fully closed positions, if desired, to predetermine the spring ratio between the driving and driven parts of the clutch mechanism.

In Fig. 8 of the drawings is illustrated an embodiment of the form of the invention shown in Figs. 6 and 7 in a clutch for transmitting a drive from a vehicle engine crankshaft to a transmission shaft adapted to be driven by the latter. In this embodiment of the invention the form of clutch and valve actuating linkage illustrated in Figs. 6 and 7 is preferably employed, with a modified form of actuating means substituted for the treadle operated arm and rod apparatus shown in Figs. 5, 6 and 7. The power plant illustrated is that of the well known type of internal combustion engine employed in motor vehicles and which is adapted to drive a shaft 106 to which the flywheel 16 is non-rotatably secured, the shaft 106 functioning here in a similar capacity as the belt 23 illustrated in Fig. 1. A second shaft 107 is adapted to be connected to the hub portion of the flywheel 16 in the same manner as previously described and illustrated in connection with the invention as applied to the press 10. The cone-shaped member 94 for actuating the linkage for moving the valves 39 and 40 to closed position is slidably mounted on the shaft 107 and is moved into and out of engagement with the linkage by a pivotally supported lever 108 having a forked end engaged in the groove 95 of the cone member 94. The lever 108 is releasably retained in a selected position for drivingly engaging the flywheel 16 and shaft 107 by a ratchet arm 109.

The shaft 106 has one end portion thereof extending into a gear box 110, this end portion having secured thereto a driving gear 111 meshing with a gear 112 carried by a countershaft 113. The latter shaft has a gear 114 meshing with a reverse idler gear 115 rotatably supported in the gear box. Extending into the gear box 110 is a shaft 116 adapted to be directly driven by the shaft 107, through the medium of a disengageable clutch element 117 having teeth engageable with teeth carried by the gear 111. When the shafts 107 and 116 are so engaged a direct forward speed drive is provided. A reverse drive can be had by shifting the clutch element 117 rearwardly so that gear teeth 118 formed thereon engage with the teeth of the reverse idler gear 115. The clutch element 117 is actuated by a suitable lever 119 pivotally supported at 120 by the gear box 110. The amount of driving torque transmitted through the clutch to the shaft 107 can be varied from a minimum to a maximum degree by operation of the valves 39 and 40 controlling the flow of fluid through the outlet passages of the housing structure 28.

Although but several specific embodiments of the invention are herein shown and described it will be understood that various changes in the size, shape and arrangement of parts may be made without departing from the spirit of our invention.

We claim:

1. In a press having a reciprocating plunger and a driving shaft operably connected therewith, a rotatable drum for driving said shaft, a gear mounted to rotate with said shaft, a planetary pinion carried by said drum and meshing with said gear, a fluid conducting housing structure carried by said drum and adapted to receive said pinion, and having means therein defining a path for fluid medium propelled by relative rotation of said pinion and gear, valve means for controlling the flow of fluid in said path, and means for operating said valve means, said valve operating means comprising a shaft driven by said drum, a member normally rotating with said shaft and said drum and having a driving connection with said valve means, yieldable means operably connecting said member and drum driven shaft, and means for causing said last mentioned shaft to rotate relative to said member against the action of said yielding means.

2. In a press having a reciprocating plunger and a driving shaft operably connected therewith, a rotatable drum for driving said shaft, a gear mounted to rotate with said shaft, a planetary pinion carried by said drum and meshing with said gear, a fluid conducting housing structure carried by said drum and adapted to receive said pinion, valve means including a sector gear for controlling fluid travel in said housing, and means for operating said valve means, said valve operating means comprising a shaft driven by said drum, a pinion rotatably mounted on said shaft and meshing with said sector gear, and means including a spring operably connected with said pinion and said drum driven shaft for causing relative rotation between said pinion and said sector gear.

3. In a press having a reciprocating plunger and a driving shaft operably connected therewith, a rotatable drum for driving said shaft, a gear mounted to rotate with said shaft, a planetary pinion carried by said drum and meshing with said gear, a fluid conducting housing structure carried by said drum and adapted to receive said pinion, valve means including a sector gear for controlling fluid travel in said housing, and means for operating said valve means, said valve operating means comprising a shaft driven by said drum, a pinion carried by said shaft and meshing with said sector gear, pressure means acting on said pinion for causing relative rotation between the latter and said sector gear in one direction, and resiliently yielding means operably connected with said shaft and said pinion for causing relative rotation between said sector gear and pinion in the opposite direction when said pressure means is inoperative.

4. In a press having a reciprocating plunger and a driving shaft operably connected therewith, a rotatable drum for driving said shaft, a gear mounted to rotate with said shaft, a planetary pinion carried by said drum and meshing with said gear, a fluid conducting housing structure carried by said drum and adapted to receive said pinion, a support member rotatably driven by said drum, valve means including a sector gear for controlling fluid travel in said housing, and means for operating said valve means, said valve operating means comprising a pinion structure carried by said support member and normally rotatable therewith, said pinion structure meshing with said sector gear, pressure means acting on said pinion structure for causing relative rotation between the latter and said sector gear in one direction, yieldable means carried by said support member and engageable with said pinion structure for drivingly connecting the latter with said support member, and a second yieldable connection between said support member and said pinion structure for rotating said pinion structure relative to said sector gear when said pressure means is released.

5. In a press having a reciprocating plunger and a driving shaft operably connected therewith, a rotatable drum for driving said shaft, a gear mounted to rotate with said shaft, a planetary pinion carried by said drum and meshing with said gear, a fluid conducting housing structure carried by said drum and adapted to receive said pinion, a second shaft rotatably driven by said drum member, a valve means controlling fluid travel in said housing structure, said valve means including a stem portion projecting from said drum, an arm non-rotataby secured to said stem portion, and means for actuating said valve means comprising a member rotatably mounted on said second shaft and movable relative thereto for actuating said valve stem arm, said valve actuating means further including an energy storing device energizable by rotation of said second shaft for controlling movement of said member.

6. A fluid clutch comprising driving and driven members, means in one of said members for confining the flow of fluid medium to a predetermined course, a pair of fluid propelling elements, one mounted on each of said members respectively and operable during relative rotation of said members to circulate fluid medium throughout said course, a valve carried by and revolvable bodily with said member having said fluid medium course for obstructing the flow of fluid medium through said course to establish a driving connection between said driving and driven members, control apparatus operatively connected with said valve and carried by and rotatable bodily with one of said members and relative thereto respectively, means for resiliently yieldably urging said control apparatus toward a predetermined angular relationship relative to said member on which it is mounted, to normally retain said valve in one position, and manually operable actuating mechanism for said valve control apparatus adapted to actuate the latter against the action of said resilient means during bodily rotation thereof for moving said valve in an opposite position.

7. A fluid clutch comprising driving and driven members, means in one of said members for confining the flow of a fluid medium to a predetermined course, a pair of fluid propelling elements, one mounted on each of said members respectively and operable during relative rotation of said members to circulate fluid medium throughout said course, a valve carried by and revolvable bodily with said member having said fluid medium course for obstructing the flow of fluid medium through said course to establish a driving connection between said driving and driven members, control apparatus operatively connected with said valve and carried by and rotatable bodily with one of said members and relative thereto respectively, means for resiliently yieldably urging said control apparatus toward a predetermined angular relationship relative to said member on which it is mounted to normally retain said valve in one position, and mechanism rotatable with and relative to the other of said members respectively for actuating said control apparatus including an element adapted for application thereto of externally derived valve controlling energy and a resiliently yieldable device coacting between said element and said latter member for yieldably opposing relative movement of said mechanism with respect thereto during a limited range of such relative movement and adapted to substantially positively limit such relative movement thereafter.

8. A fluid clutch comprising driving and driven members, means in one of said members for confining the flow of a fluid medium to a predetermined course, a pair of fluid propelling elements, one mounted on each of said members respectively and operable during relative rotation of said members to circulate fluid medium throughout said course, a valve carried by and revolvable bodily with said member having said fluid medium course for obstructing the flow of fluid medium through said course to establish a driving connection between said driving and driven members, control apparatus including an element operatively connected with said valve and carried by and rotatable bodily with one of said members and relative thereto respectively, an energy storing device adapted to effect said relative movement of said element, and manually operable means for controlling operation of said element by said device.

9. In a press having a reciprocating plunger and a driving shaft operably connected therewith, a rotatable drum mounted on said shaft and adapted for driving engagement therewith, said drum including a pair of members cooperating to form fluid chambers interiorly of said drum, said members having aligned openings for receiving an end portion of said shaft, closure means for the opening in one of said members comprising a cover plate detachably secured to a side face of said last mentioned member, an auxiliary shaft carried by said cover plate and extending axially from said drum oppositely from said driving shaft, a gear mounted to rotate with said driving shaft and disposed interiorly of said drum, a plurality of planetary pinions carried by said drum and meshing with said gear, means in said drum defining a path for fluid medium propelled by relative rotation of said gear and pinions, rotary valves for controlling the flow of fluid in said path, each of said valves having a stem portion extending axially from said drum and in radially spaced relation to said auxiliary shaft, arms secured to a respective valve stem and extending toward said auxiliary shaft, and means carried by said auxiliary shaft and engageable with said arms for operating said valves.

10. In a press having a reciprocating plunger and a driving shaft operably connected therewith, a rotatable drum mounted on said shaft and adapted for driving engagement therewith, said drum including a pair of members cooperating to form fluid chambers interiorly of said drum, said members having aligned openings for receiving an end portion of said shaft, closure means for the opening in one of said members comprising a cover plate detachably secured to a side face of said last mentioned member, an auxiliary shaft carried by said cover plate and extending axially from said drum oppositely from said driving shaft, a gear mounted to rotate with said driving shaft and disposed interiorly of said drum, a plurality of planetary pinions carried by said drum and meshing with said gear, means in said drum defining a path for fluid medium propelled by relative rotation of said gear and pinions, rotary valves for controlling the flow of fluid in said path, each of said valves having a stem portion extending axially from said drum and in radially spaced relation to said auxiliary shaft, arms secured to a respective valve stem and extending toward said auxiliary shaft, and a substantially cone-shaped member carried by said shaft and engageable with said arms for operating said valves.

11. In a press having a reciprocating plunger and a driving shaft operably connected therewith, a rotatable drum mounted on said shaft and adapted for driving engagement therewith, said drum including a pair of members cooperating to form fluid chambers interiorly of said drum, said members having aligned openings for receiving an end portion of said shaft, closure means for the opening in one of said members comprising a cover plate detachably secured to a side face of said last mentioned member, an auxiliary shaft carried by said cover plate and extending axially from said drum oppositely from said driving shaft, a gear mounted to rotate with said driving shaft and disposed interiorly of said drum, a plurality of planetary pinions carried by said drum and meshing with said gear, means in said drum defining a path for fluid medium propelled by relative rotation of said gear and pinions, rotary valves for controlling the flow of fluid in said path, each of said valves having a stem portion extending axially from said drum and in radially spaced relation to said auxiliary shaft, arms secured to a respective valve stem and extending toward said auxiliary shaft, a member adapted to rotate bodily with said auxiliary shaft and relative thereto respectively and engaged with said arms for operating said valves, and yieldable means forming an operating connection between said auxiliary shaft and said member.

FRANCIS N. COOLEY.
RUSSELL J. HARTER.